(12) United States Patent
Hirt et al.

(10) Patent No.: US 9,415,450 B2
(45) Date of Patent: Aug. 16, 2016

(54) TOOL HEAD AND METHOD FOR MACHINING A METALLIC WORKPIECE

(71) Applicant: KENNAMETAL INC., Latrobe, PA (US)

(72) Inventors: Markus Hirt, Neuhof an der Zenn (DE); Tamir Patric Sherif, Goessweinstein (DE)

(73) Assignee: KENNAMETAL INC., Latrobe, PA (US)

( * ) Notice: Subject to any disclaimer, the term of this patent is extended or adjusted under 35 U.S.C. 154(b) by 148 days.

(21) Appl. No.: 14/224,690

(22) Filed: Mar. 25, 2014

(65) Prior Publication Data

US 2014/0294527 A1    Oct. 2, 2014

(30) Foreign Application Priority Data

Mar. 26, 2013    (DE) .................... 10 2013 205 363

(51) Int. Cl.
*B23B 51/02*    (2006.01)

(52) U.S. Cl.
CPC ............. *B23B 51/02* (2013.01); *B23B 2222/88* (2013.01); *B23B 2251/02* (2013.01); *B23B 2251/082* (2013.01); *B23B 2251/18* (2013.01); *B23B 2251/248* (2013.01); *Y10T 408/03* (2015.01); *Y10T 408/909* (2015.01); *Y10T 408/9097* (2015.01); *Y10T 408/9098* (2015.01)

(58) Field of Classification Search
CPC ............... B23B 51/02; B23B 2251/02; B23B 2251/082; B23B 2251/14; B23B 2251/18; B23B 2251/248; Y10T 408/909; Y10T 408/9097; Y10T 408/9098
See application file for complete search history.

(56) References Cited

U.S. PATENT DOCUMENTS

| 706,013 | A | * | 8/1902 | Boyce | ...................... A61C 3/02 407/62 |
| 1,309,706 | A | | 7/1919 | Taylor | |
| 2,070,730 | A | * | 2/1937 | Hellstrom | .............. B23D 73/00 407/63 |
| 3,409,965 | A | * | 11/1968 | Fisher | ............................. 407/54 |
| 3,443,459 | A | | 5/1969 | Mackey et al. | |

(Continued)

FOREIGN PATENT DOCUMENTS

| DE | 10337203 A1 | 3/2005 |
| EP | 2202018 A1 | 6/2010 |

(Continued)

OTHER PUBLICATIONS

JP 2005-319538 A Translation, available at https://dossier1.j-platpat.inpit.go.jp/cgi-bin/tran_web_cgi_ejje?u=http://dossier1.j-platpat.inpit.go.jp/tri/translation/20160212003626298289070141799-967818CC653653875FE13651BB632DF07E3F47&tt1=machineV16&tt2=patent&tt3=internet&tt4=computerV16&tt5=chemistryV16&tt6=proper&tt7 (last visited Feb. 10, 2016).*

*Primary Examiner* — Sunil K Singh
*Assistant Examiner* — Ryan Rufo
(74) *Attorney, Agent, or Firm* — Matthew Bedsole

(57) ABSTRACT

A tool head includes an ovoid basic element disposed about a center axis, at least two chip grooves formed in the basic element, and a number of major cutting edges. Each major cutting edge is disposed in a convex course along a respective chip groove of the at least two chip grooves. The major cutting edges define with their radially outermost region a nominal diameter. A radial distance from each major cutting edge to the center axis in a front, tip-side, arc portion increases up to the nominal diameter and in a rear, shank-side, arc portion decreases back down to a minimum diameter.

14 Claims, 2 Drawing Sheets

(56) References Cited

U.S. PATENT DOCUMENTS

| | | | |
|---|---|---|---|
| 4,116,580 A * | 9/1978 | Hall et al. | 408/230 |
| 4,132,493 A | 1/1979 | Hosoi | |
| 4,175,896 A | 11/1979 | Kishinami et al. | |
| 4,618,296 A | 10/1986 | Allaire et al. | |
| 4,817,742 A * | 4/1989 | Whysong | 175/420.1 |
| 5,516,242 A | 5/1996 | Andronica | |
| 5,626,446 A * | 5/1997 | Ching | 408/1 R |
| 5,725,338 A | 3/1998 | Cabaret et al. | |
| 5,971,671 A | 10/1999 | Mina | |
| 6,582,165 B1 * | 6/2003 | Baba | 408/233 |
| 7,290,965 B2 | 11/2007 | Gaiser et al. | |
| 7,296,954 B2 | 11/2007 | Haenle | |
| 7,618,219 B2 | 11/2009 | Osawa et al. | |
| 2004/0024404 A1 * | 2/2004 | Steiger et al. | 606/79 |
| 2005/0260046 A1 * | 11/2005 | Hecht et al. | 408/31 |
| 2006/0056929 A1 | 3/2006 | Haenle | |
| 2007/0160437 A1 * | 7/2007 | Shultz et al. | 408/230 |
| 2009/0226271 A1 * | 9/2009 | Sampath et al. | 408/227 |
| 2010/0158626 A1 * | 6/2010 | Nakahata et al. | 408/230 |
| 2011/0236145 A1 * | 9/2011 | Pabel et al. | 408/226 |
| 2014/0169892 A1 * | 6/2014 | Hecht | 407/42 |

FOREIGN PATENT DOCUMENTS

| | | | | |
|---|---|---|---|---|
| FR | 2303650 A1 | | 10/1976 | |
| GB | 660440 A | * | 11/1951 | B23B 51/02 |
| JP | 05-096415 A | * | 4/1993 | B23C 5/10 |
| JP | 2005-319538 A | * | 11/2005 | B23C 5/10 |
| WO | 2010050388 A1 | | 5/2010 | |
| WO | 2012072652 A1 | | 6/2012 | |
| WO | WO 2012/072652 A1 | * | 6/2012 | B23B 51/02 |

* cited by examiner

TOOL HEAD AND METHOD FOR MACHINING A METALLIC WORKPIECE

BACKGROUND

1. Field of the Invention

Embodiments of the present invention relate to a tool head, in particular to a drilling head for machining a metallic workpiece, wherein the tool head has a center axis and at least two major cutting edges, which, viewed in a side view, take a convex course and define with their radially outermost region a nominal radius. Embodiments of the present invention further relate to a method for machining a metallic workpiece with a tool bearing such a tool head.

2. Background Information

In machine cutting, in particular in the drilling of hard materials, there is generally the problem of high load upon the cutting edges of the tool head. This usually has the result that only comparatively low machining rates can be set and/or a high level of wear occurs. The generated forces also occasionally lead under adverse conditions to chipping of the cutting edges.

Such problems arise in particular, for instance, in the aviation sector, in which very hard metallic materials, for instance titanium, are used. This situation is aggravated by the fact that drill holes are often made with the aid of manually operated drilling tools.

In the case of the material titanium, there is the particular problem that the chips tend to adhere or stick to the cutting edge. Succeeding cuttings can then lead to a locally very high load upon the cutting edge, so that the risk of chipping is high. Accordingly, only low feed rates can be achieved.

The cutting edge geometry of a drill can have a substantial influence on the cutting load upon the cutting edges. In a drilling head there are usually provided at least two major cutting edges, which are typically connected to one another by a chisel edge. The cutting edges run roughly radially outward and merge at a cutting corner typically into a minor cutting edge, which is continued along a chip groove in the axial direction.

Moreover, high loads also arise in respect of cast materials, for instance gray cast iron, in particular due to an inhomogeneous material structure.

EP 1 622 735 B1 discloses a drilling tool, developed specifically for the machining of cast materials, in which the major cutting edges run in a convexly curved course and subsequently, at their radially outermost point, merge into a drill back, with the formation of a bend region at a cutting corner.

Further drilling tools having convexly curved cutting edges can be derived, for instance, from U.S. Pat. No. 1,309,706 and U.S. Pat. No. 3,443,459.

SUMMARY OF THE INVENTION

Embodiments of the invention provide, among several benefits, a tool head which is improved with regard to the tool life and/or machining rate, in particular a drilling head for machining hard materials, in particular hard metals, such as titanium, or cast materials.

As one aspect of the present invention, a tool head is provided. The tool head has at least two major cutting edges, which take a convex course, define with their radially outermost region a nominal radius, and to which a chip groove is respectively assigned. The tool head is marked overall by a three-dimensional, ovoid basic shape, along which, on the one hand, the major cutting edges run and into which, on the other hand, the chip grooves are formed. The ovoid basic shape is here characterized in that a radial distance of the major cutting edges to the center axis, in a front tip-side arc portion, increases up to a nominal diameter, and then, in a rear shank-side arc portion, decreases back down to a minimum diameter.

As a result of the distinct ovoid shape, the forces, in the machine cutting of a workpiece made of a hard material, in particular titanium, hard metal or cast material, are transmitted and conducted in a particularly advantageous manner along the ovoid surface of the drilling head, so that, all in all, a significantly lesser load upon the cutting edges is achieved. Studies have shown that, with an ovoid basic shape of this type, significantly higher cutting speeds and feed rates compared to traditional drilling tools can be obtained.

Of particular importance in this context is the tapered region in the shank-side arc portion, so that the major cutting edges do not end in a cutting edge corner or merge at their nominal diameter into a minor cutting edge, as is customary in traditional drills also having convexly curved cutting edges. The tool head is therefore free from minor cutting edges which run along the chip grooves.

The tool head is therefore overall marked by convexly curved major cutting edges, which, in the rear shank-side portion, shrink back to the minimum radius. The major cutting edges are respectively adjoined in the peripheral direction by a surface segment, in the form of a flank, of the ovoid basic element, which surface segment tapers to the following chip groove.

In accordance with the ovoid basic shape, the front arc portion preferably has a greater axial length than the rear arc portion, i.e., the axial distance of the region of greatest diameter (nominal diameter) to the foremost point of the tool head is greater than the axial distance between the region of nominal diameter up to the shank-side end of the major cutting edge. In particular, the front arc portion here has an axial length which is greater, by a factor of 1.5 to 2 times, compared to the rear arc portion.

Furthermore, the minimum diameter preferably corresponds to 0.9 to 0.7 times the nominal diameter. As a result of the reduced diameter in the shank-side region of the tool head, a certain clearance is obtained, which—in addition to the particularly advantageous force transmission—is of particular advantage also with regard to withdrawal from a drill hole.

In addition, the rear arc portion is here expediently more strongly curved than the front arc portion. As a result, the axial length which is necessary in total is kept low, in combination with good force transmission.

The entire drilling head, that is to say the axial length of the major cutting edges, preferably has an axial length in the direction of the center axis which lies within the range of 0.8 times to 1.5 times the nominal diameter.

Preferably, the individual arc portions are, in turn, preferably themselves composed of a multiplicity of individual segments having different radii. This enables, on the one hand, the advantageous and desired ovoid shape to be realized. At the same time, through a suitable choice of individual radii of the segments, an optimized force transmission is obtained, so that the cutting load is kept low overall. Expediently, the radii of the segments of the front arc portion here preferably steadily increase in the direction of the rear arc portion and, furthermore, the radii of the segments of the rear arc portion preferably steadily decrease again, starting from the front arc portion. In the region of nominal radius, the major cutting edge therefore has the greatest radius and thus the least curvature.

The major cutting edges are preferably connected to one another on the end face by a chisel edge. In particular, in the region of the chisel edge, a pointing is introduced.

In an expedient embodiment, the tool head has in the region of the chisel edge a traditional point grinding, in particular, for instance, a conical grinding. The central drill bit region is therefore configured in the style of a traditional drill bit, so that a good centering function is ensured. The point grinding extends in the radial direction preferably merely over a diameter corresponding to 0.05 times to 0.1 times the nominal diameter. As a result of this overall very small point grinding, a centering point is substantially configured.

The major cutting edges run, all in all, roughly helically along the surface of the ovoid basic element. Correspondingly hereto, the chip grooves also run spirally.

The tool head is preferably configured as a reversibly exchangeable tool head and is therefore designed for so-called modular carrier tools, in which a respective tool head is inserted into a corresponding receptacle of a carrier. The tool head is here preferably overall configured in one piece from a monolithic basic element, in which the chip grooves are introduced, and the major cutting edges are configured by a grinding process. The tool head has a coupling pin for insertion into a receptacle of the carrier. Expediently, this is configured for reversible and, in particular, tool-less insertion into the receptacle of the carrier.

Overall, the rear arc portion of the major cutting edges is adjoined by a shank region, which, in the case of the modular carrier tool, is formed by the carrier, wherein the diameter of the shank region is smaller than or equal to the minimum diameter. The shank region therefore has no guiding or cutting function. These functions are performed solely and completely by the ovoid tool head.

With the tool head which is described here, having the substantially ovoid basic shape, significantly higher cutting speeds compared to traditional tools can be obtained in respect of hard metals, in particular titanium. Thus the maximum cutting speed in the use of traditional drilling heads, for instance having normal conical grinding, is maximally VC=20 m/min. at a feed rate of F=0.05 mm/revolution. Studies have now shown that, with the tool head which is described here, the cutting speed was able to be doubled to VC=40 m/min., with the same or even improved drilling results, and the feed rate/revolution was likewise able to be significantly increased, for instance to values of F=0.12 to 0.15.

Accordingly, in the inventive method for machining a hard metallic material, in particular titanium, a cutting speed of 30 m/min. or more is also preferably set. Moreover, a feed rate within the range from F>0.1 to, for instance, F=0.5 is set. Preferably, at the cutting speed of VC=about 40 m/min., a feed rate of about 0.15 mm/revolution (in the case of a double-edged tool) is set.

The particular advantage of the ovoid shape which is presented here is the diversion and transmission of the cutting forces and of the cutting pressure via the surface into the shank of the carrier, so that, all in all, the load upon the tool head is reduced.

BRIEF DESCRIPTION OF THE ACCOMPANYING FIGURES

Novel features and characteristics of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the disclosure.

Figure 1:
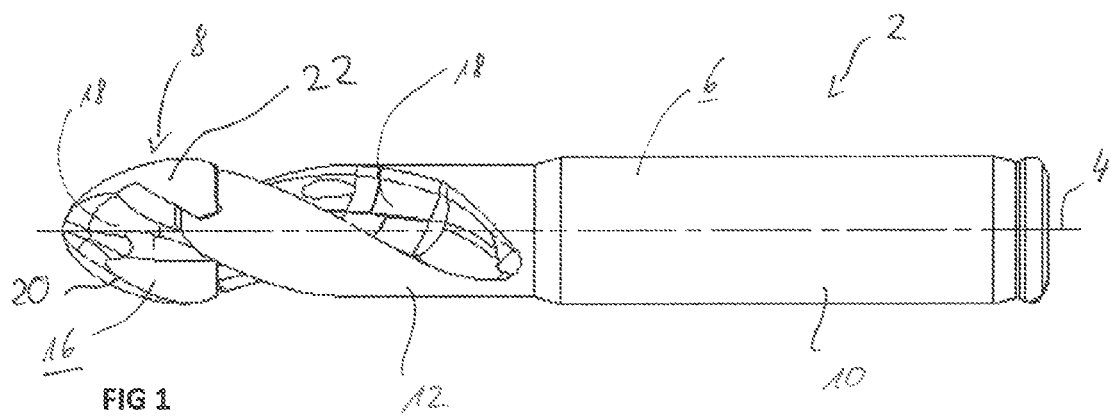
FIG. 1 shows a side view of a modular carrier tool having a drilling head.
Figure 2:
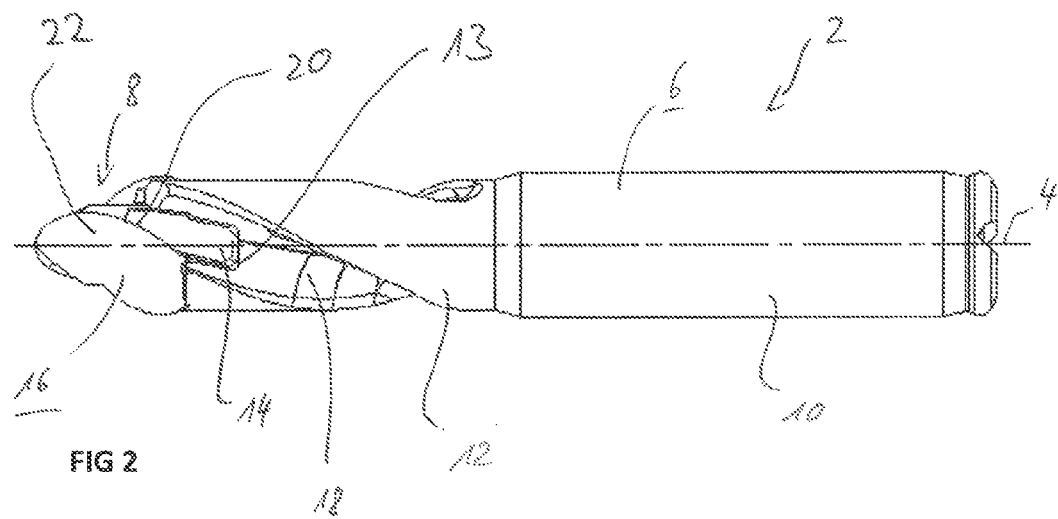
FIG. 2 shows a side view of the carrier tool according to FIG. 1, rotated through 90° compared to the representation shown in FIG. 1.

The example drilling tool 2 represented in FIGS. 1 and 2 is configured as a modular carrier tool, which extends along a central longitudinal axis 4 and has a carrier 6 and a drilling head 8 inserted therein. The carrier 6 is in turn divided into a rear shank region 10 and a front, in the illustrative embodiment grooved, shank region. The rear shank region 10 serves for clamping of the drilling tool 2 into a machine tool. The front shank region 12 has on the end face a receptacle 13 (FIG. 2), in which the drilling head 8 is exchangeably inserted with the aid of a coupling pin 14. The insertion is realized preferably without tools, by first inserting the drilling head 8 axially into the receptacle 13 and then turning it, say, through 90°, for instance. An automatic centering and clamping of the coupling pin 14 in the receptacle 13 is hereupon realized.

In the illustrated example embodiment, the drilling head 8 is all in all a monolithic, one-piece drilling head, in particular a hard metal or sintered drilling head, which is formed by an ovoid basic element 16 in which chip grooves 18 are introduced. The chip grooves 18 are respectively bounded by major cutting edges 20, which extend helically along the surface of the basic element 16. Each of the major cutting edges 20 is adjoined in the peripheral direction by a surface segment 22 of the ovoid basic element 16, in the form of a flank. These segments 22 extend in the peripheral direction respectively up to the following groove.

Figure 4:
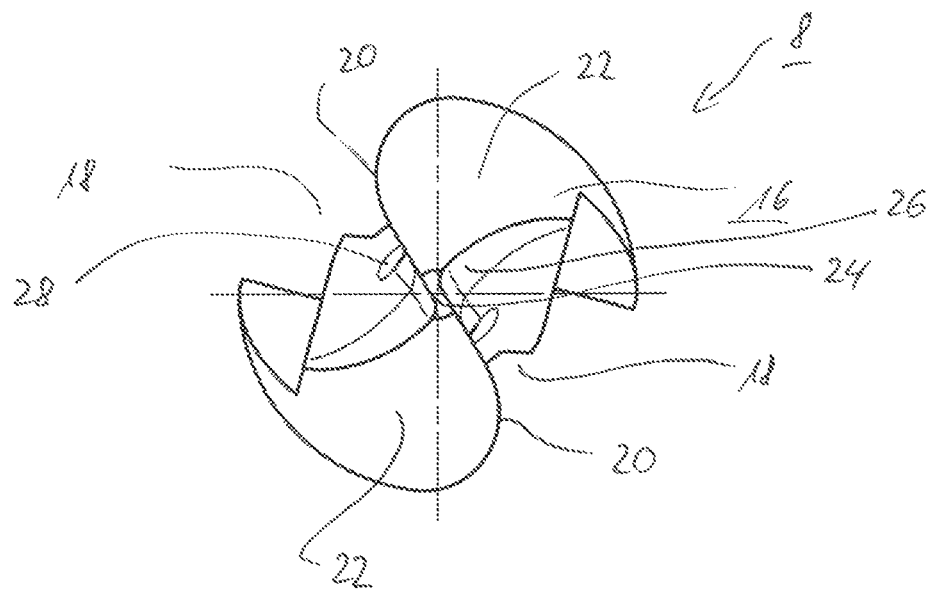
FIG. 4 shows an end view of the drilling head according to FIG. 3.

The two major cutting edges 20 are mutually connected in the center region by a chisel edge 24 (cf. FIG. 4). In the region of the chisel edge 24, the basic element 16 has a point grinding, for instance in the style of a conical taper. At the same time, a taper 26 is also provided in this region, in order to reduce the drill center in the region of the center edge 24. As can further be seen, in particular, from FIG. 4, coolant bores 28 are also additionally configured in the chip grooves 18.

Figure 3:
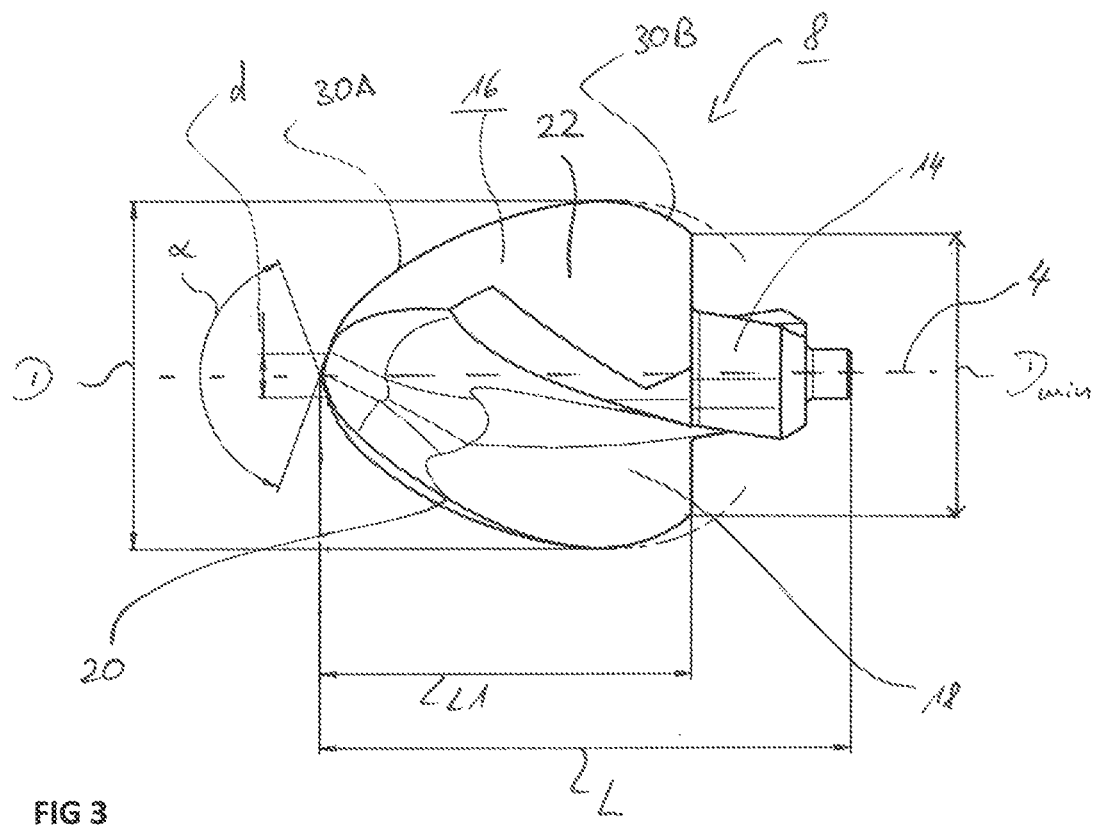
FIG. 3 shows a side view of the drilling head inserted in the carrier tool according to FIG. 1.

As can be seen, in particular, from FIG. 3, the drilling head 8 has overall a nominal diameter D. In addition, the drilling head has an axial total length L, which reaches from the tip of the chisel edge 24 up to a rear centering pin. In contrast, the major cutting edges 20 extend merely over an axial length L1 up to a rear step, which is then adjoined by the coupling pin 14. The nominal diameter D here corresponds roughly to the axial length L1.

The rear arc portion 30B tapers, starting from the nominal diameter D, back to a minimum diameter $D_{min}$. Preferably, this lies roughly within the range of 0.9 to 0.7 times the nominal diameter D.

As can be seen, in particular, from the side view of FIG. 3, the convex course of the major cutting edges 20 is composed of a front arc portion 30A and an adjoining rear arc portion 30B. The front arc portion 30A here extends up to the region having the greatest radial distance of the respective major cutting edge 20 to the central longitudinal axis 4, where the drilling head 8 assumes the nominal diameter D. Furthermore, with reference to FIG. 3, it can be seen that the rear arc portion 30B has a significantly stronger curvature following on from the front arc portion 30A. The dashed line depicted in FIG. 3 shows an imaginary continuation of the front arc portion 30A, with constant radius of curvature.

Due to the ovoid contour, the two arc portions 30A, 30B are composed of a plurality of segments having different radii. The radii here respectively increase to the region of nominal diameter D. Directly on the tip in the region of the chisel edge, the two major cutting edges 20 are oriented at a point angle α to each other, which angle, in the illustrative embodiment, lies at 140° and generally within the range between, for instance, 130° and 150°.

The chisel edge 24, as the center region between the two major cutting edges 20, has a comparatively small diameter d, which preferably lies merely between 0.05 to 0.1 times the nominal diameter D.

The here described ovoid basic geometry of the drilling head 8, having the convex, in particular helically guided major cutting edges 20, which also taper again in the rear arc portion 30B, so that no cutting edge corner is configured, in conjunction with the introduced chip grooves 18 and the segments 22, which latter are likewise arched, in particular, in accordance with the ovoid surface contour, leads to a particularly good force and pressure transmission into the carrier 6. As a result, the cutting load is less, and higher feed rates, as well as higher cutting speeds, compared to traditional drilling heads 8 can be obtained.

The present invention has been described with reference to a modular drilling tool having a double-edged drilling head, yet is not limited hereto. Instead of a modular tool, a one-piece tool, in particular a solid-carbide tool, having the specific head geometry is alternatively configured. In principle, the head geometry can also be used in other tools, for example milling tools. Finally, the head geometry can also be used in triple-edged or multi-edged tools. The cutting edges are preferably configured, in particular by grinding, on the basic element, but alternatively can also be configured as separately fastened cutting inserts or cutter bars.

The invention claimed is:

1. A tool head comprising:
   an ovoid element disposed about a center axis;
   at least two chip grooves formed in the ovoid element;
   a number of major cutting edges, each major cutting edge disposed in a convex course along a respective chip groove of the at least two chip grooves, the major cutting edges defining with their radially outermost region a nominal diameter; and
   a shank region;
   wherein a radial distance from each major cutting edge to the center axis in a front, tip-side, arc portion increases up to the nominal diameter and in a rear, shank-side, arc portion decreases back down to a minimum diameter;
   wherein the rear arc portion has a radius of curvature smaller than a radius of curvature of the front arc portion; and
   wherein the shank region adjoins and directly abuts the rear arc portion of the major cutting edges, the shank region having a diameter which is smaller than the minimum diameter at the abutment between the shank region and the rear arc portion.

2. The tool head as recited in claim 1, wherein the front arc portion has a greater axial length than an axial length of the rear arc portion.

3. The tool head as recited in claim 2, wherein the axial length of the front arc portion is greater than the axial length of the rear arc portion by a factor of 1.5 to 2 times.

4. The tool head as recited in claim 1, wherein the minimum diameter corresponds to 0.9-0.7 times the nominal diameter.

5. The tool head as recited in claim 1, wherein the major cutting edges are connected to one another by a chisel edge and, in the region of the chisel edge, a taper is introduced.

6. The tool head as recited in claim 5, comprising a conical taper in the region of the chisel edge.

7. The tool head as recited in claim 6, wherein the chisel edge has a diameter within the range up to 0.05-0.1 times the nominal diameter.

8. The tool head as recited in claim 1, wherein the major cutting edges run helically along the chip grooves.

9. The tool head as recited in claim 1, wherein the tool head is configured as a exchangeable tool head and further comprises a coupling pin structured to be inserted into a receptacle of a carrier.

10. A method for machining a metallic workpiece with a tool having a tool head as recited in claim 1.

11. The method as recited in claim 10, wherein the method comprises machining the metallic workpiece at a cutting speed of 30 m/min.

12. The method as recited in claim 11, wherein the metallic workpiece is formed from titanium or a high alloy steel.

13. The method as recited in claim 10, wherein the method comprises machining the metallic workpiece at a feed rate of about 0.15 mm/revolution.

14. The tool head as recited in claim 1, wherein an axial length of the tool head in the direction of the center axis is within the range of 0.8 times to 1.5 times the nominal diameter.

* * * * *